(12) United States Patent
Ferrall et al.

(10) Patent No.: US 7,288,581 B2
(45) Date of Patent: Oct. 30, 2007

(54) PROCESS FOR THE STABILIZATION OF DUSTING SURFACES

(75) Inventors: Eric Ferrall, Saline, MI (US); Michael Spradling, Ann Arbor, MI (US); Manfred Selig, Burghausen (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 0 days.

(21) Appl. No.: 11/012,647

(22) Filed: Dec. 15, 2004

(65) Prior Publication Data

US 2006/0128838 A1 Jun. 15, 2006

(51) Int. Cl.
*B05C 1/16* (2006.01)
*E01C 11/24* (2006.01)
*C04B 24/26* (2006.01)
*C08K 3/00* (2006.01)

(52) U.S. Cl. .................. 524/5; 405/129.9; 405/421.1; 405/129.95; 405/264; 427/136; 427/385.5; 427/421; 106/900

(58) Field of Classification Search .............. 524/3, 524/5; 405/129.9; 427/136, 421
See application file for complete search history.

(56) References Cited

U.S. PATENT DOCUMENTS

| | | | | |
|---|---|---|---|---|
| 3,736,758 A | * | 6/1973 | Dolfing et al. | 405/264 |
| 4,592,931 A | * | 6/1986 | Cargle | 427/136 |
| 6,084,018 A | * | 7/2000 | Wildburg et al. | 524/424 |
| 6,489,381 B1 | * | 12/2002 | Dreher et al. | 524/5 |
| 2003/0180466 A1 | * | 9/2003 | Rohrbaugh et al. | 427/372.2 |
| 2005/0084334 A1 | * | 4/2005 | Shi et al. | 405/129.9 |
| 2006/0020058 A1 | | 1/2006 | Grawe | |

FOREIGN PATENT DOCUMENTS

| | | |
|---|---|---|
| JP | 49046716 | 12/1974 |
| JP | 93053881 | 8/1993 |
| WO | WO 2004/037741 A2 | 5/2004 |
| WO | WO 2004/092094 A1 | 10/2004 |
| WO | WO 2005/092816 A2 | 10/2005 |
| ZA | 8803253 | 1/1989 |

OTHER PUBLICATIONS

American Heritage College dictionary, 4th Ed, 2002, p. 233,803.*
T.G. Fox, Bull. Am. Physics Soc. 1, 3, p. 12 (1956).
Polymer Handbook, 2nd Edition, J. Wiley & Sons, new York (1975).
English Abstract corresponding to WO 04092094 A1, Oct. 28, 2004.
English Abstract corresponding to WO 05092816 A2, Oct. 6, 2005.
English Abstract corresponding to JP 02 283792 A, Nov. 21, 1990.

* cited by examiner

*Primary Examiner*—Duane Smith
*Assistant Examiner*—Ives Wu
(74) *Attorney, Agent, or Firm*—Brooks Kushman P.C.

(57) ABSTRACT

The invention relates to a process for the stabilization of dusting surfaces characterized in that the dusty ground is tilled or scarified and mixed with polymers in form of water-redispersible polymer powders, which are optionally reemulsifiably modified, or reemulsifiable modified aqueous polymer dispersions, which are optionally sprayed on to the untreated dusty ground. In a preferred embodiment the redispersible polymer powder, respectively the reemulsifiable modified redispersible polymer powder or the reemulsifiable modified aqueous polymer dispersion, is combined with hydraulically setting compounds, preferably cement and/or gypsum.

28 Claims, No Drawings

PROCESS FOR THE STABILIZATION OF DUSTING SURFACES

BACKGROUND OF THE INVENTION

1. Field of the Invention

The invention relates to a process for the stabilization of dusting surfaces with polymers in form of water-redispersible polymer powders, which are optionally reemulsifiable modified, or reemulsifiable modified aqueous polymer dispersions.

2. Background Art

Dust control and soil stabilization is a major environmental and health issue. Dust, for example road dust of unpaved roads and gravel roads, pollutes the environment and poses health risks. Soil stabilization retards both wind and water erosion. Furthermore the condition of roads is an important part of road safety. It is improved by the stabilization of unpaved roads preventing the development of ruts, bumps and washboards. Fine particle stabilization also has significant economic advantages in extending the working lives of such machinery as air heating and cooling units and turbine engines. In general dust is composed of fine particles with a particle size of 1 μm to 2 mm.

For soil stabilization it has been the state of art to spray mineral oil products onto the surface of unpaved roads with all the environmental disadvantages. Water-dilatable binders like calcium chloride solutions and lignosulfonate solutions have also been used for dust control and surface stabilization. JP-B 05-53881, ZA-A 8803253, and JP-B 49046716 concern surface stabilization with conventional aqueous polymer dispersions. Aqueous polymer solutions, e.g. solutions of polyacrylic acid have been used to control dust on gravel roads. The major problem of water based polymer products is that 1) they only bind dusting particles a single time because they do not redisperse, 2) they are slow to dry and form films due to the water necessary to apply the dispersions and 3) they are more difficult to till or scarify into the material being bound due to their inherent liquid state. Therefore every half year these compounds have to be applied again. When used in deep reaching applications (i.e. depths of more than one inch) to improve durability, water based products show the additional disadvantage of drying much too slowly, which leads to prohibitive closure times of the road. Considering the above mentioned rate of erosion and the subsequent frequent rate of application, the state of the art is not only economically disadvantageous but also environmentally questionable considering the biodegradability and the chemical nature of most monomer bases now in use for this type of application.

U.S. Pat. No. 3,736,758 discloses a process for rendering soil at chemical storage sites impervious to liquids, by adding a conventional polymer dispersion to a depth of soil, moistening and compacting the soil, and applying an impermeable thick film or coating of an organic polymer over the treated and compacted soil to render the surface impermeable. The process is expensive due to the amount of impermeable polymer added onto the surface, and for many such polymers requires an organic solvent which is environmentally undesirable. If the integrity of the stabilized soil is compromised, the soil cannot be again stabilized without removing the impermeable coating and adding additional polymer dispersion.

SUMMARY OF THE INVENTION

It was thus an object of the invention to provide a process for soil stabilization of dusting surfaces which avoids environmental disadvantages, and which does not need a complete renewal of the surface treatment in short time cycles. These and other objects are achieved by a process for the stabilization of dusting surfaces, characterized in that the dusty ground is tilled or scarified and mixed with polymers in the form of water-redispersible polymer powders, which are optionally reemulsifiable modified, or reemulsifiable modified aqueous polymer dispersions, which are optionally sprayed on to the untreated dusty ground.

DETAILED DESCRIPTION OF THE PREFERRED EMBODIMENT(S)

Redispersible polymer powders are characterized in that they are readily redispersible after stirring with water, largely breaking down into the original particles of the initial dispersions, and forming water resistant polymer films. Redispersible reemulsifiable modified polymer powders are redispersible polymer powders that are modified by the addition of an amount of dispersant which causes controlled partial reemulsification of the polymer film on exposure to sufficient moisture. Reemulsifiable modified polymer dispersions, in contrast to common polymer dispersions which build up water-resistant polymer films, contain an additional amount of dispersant which causes controlled reemulsification of the first obtained polymer film after further contact with water. In general, reemulsifiable modified polymer powders or reemulsifiable modified aqueous polymer dispersions mean that a polymer film resulting from application of the polymer or polymer dispersion will begin reemulsifying (breaking down) immediately on exposure to water under normal conditions to a degree of at least 50% by weight, preferably of at least 90% by weight. The polymers are based on one or more monomers from the group consisting of vinyl esters, (meth) acrylates, vinyl aromatics, olefins, 1,3-dienes and vinyl halides and, if required, further monomers copolymerizable therewith.

Suitable vinyl esters are those of carboxylic acids having 1 to 12 C atoms. Vinyl acetate, vinyl propionate, vinyl butyrate, vinyl 2-ethylhexanoate, vinyl laureate, 1-methylvinyl acetate, vinyl pivalate and vinyl esters of α-branched monocarboxylic acids having 9 to 11 C atoms, for example VeoVa9$^R$ or VeoVa10$^R$ (trade names of Resolution Performance Products), are preferred. Vinyl acetate is particularly preferred.

Suitable acrylate and methacrylate monomers include esters of straight-chain or branched alcohols having 1 to 15 carbon atoms. Preferred methacrylates or acrylates are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate and 2-ethylhexyl acrylate. Methyl acrylate, methyl methacrylate, n-butyl acrylate, tert-butyl acrylate and 2-ethylhexyl acrylate are particularly preferred. Preferred vinyl aromatics are styrene, methylstyrene and vinyltoluene. A preferred vinyl halide is vinyl chloride. The preferred olefins are ethylene and propylene, and the preferred dienes are 1,3-butadiene and isoprene.

If required, 0.1 to 5% by weight, based on the total weight of the copolymer, of auxiliary monomers may also be copolymerized. Preferably, 0.5 to 2.5% by weight of auxiliary monomers is used. Examples of auxiliary monomers are ethylenically unsaturated mono- and dicarboxylic acids, preferably acrylic acid, methacrylic acid; ethylenically unsaturated carboxamides and carbonitriles, preferably acrylamide and acrylonitrile; and ethylenically unsaturated sulfonic acids and their salts, preferably vinyl sulfonic acid and 2-acrylamido-2-methylpropane sulfonic acid. Further examples are precrosslinking co-monomers such as poly-ethylenically unsaturated comonomers, for example divinyl adipate or triallyl cyanurate, or postcrosslinking comonomers, for example N-methylolacrylamide (NMA), N-methylol-methacrylamide, alkyl ethers, such as the isobutoxy ether, or esters, of N-methylolacrylamide. Comonomers having epoxide functional groups, such as glycidyl methacrylate and glycidyl acrylate, are also suitable. Further examples are comonomers having silicon functional groups, such as (meth)acryloyloxypropyltri(alkoxy)silanes, vinyltrialkoxysilanes and vinylmethyldialkoxysilanes.

The choice of monomers or the choice of the amounts by weight of the comonomers is made in such a way that in general a glass transition temperature Tg of −50° C. to +50° C., preferably −30° C. to +40° C., most preferably −5 to 15° C., results. The glass transition temperature Tg of the polymer can be determined in a known manner by means of differential scanning calorimetry (DSC). The Tg can also be calculated approximately beforehand using the Fox equation. According to T. G. Fox, BULL. AM. PHYSICS SOC. 1, 3, page 123 (1956), the following is applicable: $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in Kelvin of the homopolymer of the monomer n. Tg values for homopolymers appear in Polymer Handbook, 2nd Edition, J. Wiley & Sons, New York (1975).

Particularly preferred are homopolymers and copolymers of vinyl ester monomers, particularly vinyl acetate. Most preferred are polyvinyl acetate, copolymers of vinyl acetate and ethylene, copolymers comprising vinyl acetate, ethylene and a vinylester(s) of α-branched monocarboxylic acids having 9 to 11 C atoms. It being possible for said polymers also to contain, if required, one or more of the above mentioned auxiliary monomers.

The polymers are prepared in a manner known per se by the emulsion polymerisation process or by the suspension polymerisation process, preferably by the emulsion polymerisation process, the polymerisation temperature being in general 40° C. to 100° C., preferably 45° C. to 90° C. In the copolymerisation of gaseous comonomers such as ethylene, 1-3-butadiene or vinyl chloride, superatmospheric pressure, in general from 5 bar to 100 bar, may also be employed.

The polymerisation is initiated with the water-soluble or monomer-soluble initiators or redox initiator combinations customarily used for emulsion polymerisation or suspension polymerisation. In a preferred embodiment the monomers are stabilized by protective colloids.

Suitable protective colloids are polyvinyl alcohols; polyvinylpyrrolidones; polyvinyl acetals; polysaccharides in water-soluble form, such as starches (amylose and amylopectin), celluloses and their carboxymethyl, methyl, hydroxyethyl and hydroxypropyl derivatives; proteins, such as casein or caseinate, soybean protein and gelatin; ligninsulfonates; synthetic polymers, such as (meth)acrylic acid, copolymers of (meth)acrylates with comonomer units having carboxyl functional groups, poly(meth)acrylamide, polyvinylsulfonic acids and their water-soluble copolymers; melamine formaldehyde sulfonates, naphthalene formaldehyde sulfonates and styrene maleic acid and vinyl ether/maleic acid copolymers. Partially hydrolysed or completely hydrolysed polyvinyl alcohols are preferred. The protective colloids are generally added in a total amount of 1 to 20% by weight, based on the total weight of the monomers, during the polymerisation.

It may be advantageous additionally to use small amounts of emulsifiers if desired, for example 1 to 5% by weight, based on the amount of monomers. Suitable emulsifiers are anionic, cationic and non-ionic emulsifiers, for example anionic surfactants, such as alkylsulfates having a chain length of 8 to 18 C atoms, alkyl or alkylaryl ether sulphates having 8 to 18 C atoms in the hydrophobic radical and up to 40 ethylene oxide or propylene oxide units, alkane- or alkylarylsulfonates having 8 to 18 C atoms, esters and monoesters of sulfosuccinic acid with monohydric alcohols or alkylphenols, or nonionic surfactants, such as alkyl polyglycol ethers or alkylaryl polyglycol ethers having 8 to 40 oxyetehylene units therein.

The thus obtained initial polymer dispersions have a solids content of 30 to 70%, and may be diluted for further processing or final application. For the preparation of the water-redispersible polymer powders, the aqueous dispersions are spray-dried after the addition of protective colloids as spraying assistants.

As a rule, the spraying assistant is used in a total amount of 3 to 30% by weight, based on the polymeric components of the dispersion. This means that the total amount of the protective colloid before the drying process should be at least 3 to 30% by weight, based on the polymer fraction, preferably, 5 to 20% by weight, based on the polymer fraction, are used. Suitable spraying assistants are partially hydrolysed polyvinyl alcohols; polyvinylpyrrolidones; polysaccharides in water-soluble form such as starches (amylose and amylopectin), celluloses and their carboxymethyl, methyl, hydroxyethyl and hydroxypropyl derivatives; proteins such as casein or caseinate, soybean protein, gelatin; ligninsulfonates; synthetic polymers such as poly(meth)acrylic acid, copolymers of (meth)acrylates with co monomer units having carboxyl functional groups, poly(meth)acrylamide, polyvinylsulfonic acids and their water-soluble copolymers; melamine formaldehyde sulfonates, naphthalene formaldehyde sulfonates and styrene/maleic acid and vinyl ether-/maleic acid copolymers.

The rebuilding mechanism can be enhanced by the combination of the water-redispersible polymer powders with dispersants, to obtain reemulsifiable modified water-redispersible polymer powders. This type of polymer powder facilitates the redispersion of the polymer powder after contact with water. Common dispersants are the protective colloids and emulsifiers already mentioned above. Preferred emulsifiers are based on ethoxylated fatty alcohols. The preferred dosage of additional dispersant is 1 to 20% based on the total weight percent of redispersible polymer powder used. These additional components for application and performance control may be added either during the stage of polymerization, the stage of spray drying or as a post add, the latter being preferred.

In the case of the reemulsifiable modified aqueous polymer dispersions, dispersants are added after the preparation of the polymer dispersion. Common dispersants are the protective colloids and emulsifiers already mentioned above. Preferred emulsifiers are based on ethoxylated fatty alcohols. The preferred dosage of dispersant is 1 to 20% based on the total weight percent of the polymer dispersion used.

In a further preferred embodiment the redispersible polymer powder, and more preferably the reemulsifiable modified redispersible polymer powder or the reemulsifiable modified aqueous polymer dispersion, is combined with hydraulically setting compounds, preferably cement and/or gypsum. With this combination an improvement of the drying time is achieved, and redispersion of compositions containing hydraulically setting compounds is aided as well.

The process is suitable for the soil stabilisation and dust binding of various undergrounds: Unpaved dirt roads, forestry roads, agricultural access roads, road shoulders, road bed sub-base, construction sites, land development, slopes, and dumps, coal piles, seasonal roads, private roads and driveways, parking lots, airstrips, athletic fields, landing pads, public parks, and athletic fields. Usually the underground is tilled or scarified to a depth of 1 to 500 mm, preferably 50 to 150 mm, and the loose material is admixed with the polymer powder or the polymer dispersion. Preferably 0.01 to 5% b.w. polymer solids, particulary 0.2 to 2.0% b. w. polymer solids, of polymer powder or polymer dispersion, based on the soil material to be stabilized, is used. In general, the thus prepared underground is then levelled and compacted or graded. Alternativly polymer dispersions can be sprayed onto the untreated underground.

For the activation of binding of the underground it only needs to be exposed to moisture, preferably by spraying with water, whereupon film-forming of the water-redispersible polymer powder occurs. Redispersable powders, especially with additional dispersant(s) (reemulsifiable modified), have unique performance properties superior to the state of the art: With every rainfall, the film fibers will desintegrate to a controlled extent allowing a refilming process to start in the next drying cycle. Thus any newly formed dust particles will be trapped, with film-forming occuring as deep as the water penetrates into the material and as deep as the polymer powder is admixed with the loose dirt material. For these reasons, in contrast to the soil stabilization by spraying the underground with common polymer dispersions which build strong films but without any rebinding capacity, the claimed polymer film is rebuilt again and again after contact with moisture. Additionally dust binding occurs as deep as the dust is admixed with polymer powder. With common aqueous polymer dispersions, binding of dust particles only occurs on the initial application and proper film formation of the polymer only occurs near the application surface where sufficient drying can occur by evaporation.

In the case of reemulsifiable modified polymer dispersions, no strong water-resistant polymer films occur as is the case with common polymer dispersions. After rainfall or after spraying with water following a longer dry period, the polymer film disintegrates and is rebuilt again and again, and additional dust binding occurs in a similar mechanism as already described above for redispersible polymer powders.

With cementitious materials added, further improvement to the state of the art occurs as a result of a drying mechanism in addition to evaporation. Cementitious materials may be added in amounts of less than 1% by weight to 20% by weight, preferably 1% to 10%, and most preferably about 1% to 4% by weight, relative to the weight of soil to be bound. As is the case with common aqueous dispersions, proper film formation below the surface of an application, whether initially sprayed onto the surface or tilled into the ground, may never occur, and then only over very long periods of time. With the addition of cementitious materials, drying occurs below the surface via chemical consumption of the water, whether a polymer powder or an aqueous dispersion is applied, to support proper film formation regardless of the localized evaporation rate at varying depths.

The soil thus stabilized may, in general, be quite hard, similar upon visual inspection in the case of sand or sandy soils, to the appearance of cements or mortars. The soil thus stabilized also possesses considerable tensile strength and modulus, and depending upon the depth of soil treated and the amount of treating agent, may support considerable loads. Should the upper level crack, be pulverized with heavy machinery, or have additional soil or dust deposited thereon, the soil may be wetted and again compacted, renewing the stabilization of the soil. While a strongly stabilized soil is thus obtained, the soil remains permeable to water.

Because it is desirable for the soil to be able to be restabilized by addition of moisture, whether purposefully added or as a result of natural precipitation, it is most desirable that the surface remain free of impermeable films and vapor barriers, whether applied in situ, for example by spraying a non-foaming polyurethane or other thermoset polymer layer, or by coverage with a plastics film. Thus, the process of the invention preferably does not employ the addition of any water impermeable film, and in particular, any polymer film of sufficient integrity and imperviousness such that a relatively uniform rewetting of the soil is prevented. It would not depart from the spirit of the invention, however, to spray onto the treated area a very thin film of a water impermeable substance uniformly or over portions, wherein the thickness or the a real discontinuities or both are such that rewetting of the soil can in fact readily take place, preferably without scarifying or reworking of the soil. Such films are, in general, less than 0.1 mm in thickness, and are themselves preferably formed of an aqueous polymer dispersion, but not of a polymer which is water redispersible. Coatings of thermoset, crosslinked polymers such as polyurethanes, epoxy resins, vinyl ester resins, and the like are in particular preferably avoided. Even without such coatings, a hard, stabilized soil is produced, which, in the case of use of redispersible polymers alone is at least somewhat water permeable, and in the case where cementitious ingredients are also added, is water vapour permeable, which is not the case when films such as polyurethanes or epoxy resins are applied to the surface.

The tests below serve as a further illustration of the invention:

For the test of soil stabilization, dirt was obtained from two different Michigan dirt roads that represent the primary target for such an application. The dirt collected was characterized before testing began with the following results:

| Sieve Size | Percent Retained |
| --- | --- |
| Particle Size Analysis of MI Dirt | |
| 16 | 44.4 |
| 30 | 15.4 |
| 50 | 19.1 |
| 70 | 7.4 |
| 100 | 5.2 |
| 200 | 4.4 |
| Pan | 4.2 |
| Physical Properties of MI Dirt | |
| Avg Water Content | 3.48% |
| Avg Wet Density | 1.92 g/ml |
| Avg Dry Density | 1.79 g/ml |

Testing of Soil Stabilisation:

COMPARISON EXAMPLE 1

250 g of MI dirt was weighed into a cup.

For testing a state of art dust binding composition, 4.7 g of a polyacrylate dispersion (solids content 47%) and 9 g of water were mixed into the dirt until uniform wet-out appeared to have been achieved. The cup was then placed in an oven at 50° C. to accelerate drying. After 12 hours the cup was removed from the oven and was subjectively evaluated for binding of the dust by shaking the cup and observe the mass of particles that is emitted.

COMPARISON EXAMPLE 2

According to comparison example 1, but instead of 4.7 g of the polymer dispersion, 15 g of water was mixed with the dust. The cup was then placed in an oven at 50° C. to accelerate drying. After 12 hours the cup was removed from the oven and was subjectively evaluated for binding of the dust by shaking the cup and observe the mass of particles that is emitted.

EXAMPLE 3

According to comparison example 1, but instead of 4.7 g of the polymer dispersion, 5 g of a redispersible polymer powder based on a vinyl acetate-ethylene copolymer was mixed with a metal spatula into the dirt until it seemed homogenous. Then 15 g of water was added to the homogenous mixture and mixed in. The cup was then placed in an oven at 50° C. to accelerate drying. After 12 hours the cup was removed from the oven and was subjectively evaluated for binding of the dust by shaking the cup and observe the mass of particles that is emitted.

EXAMPLE 4

According to comparison example 1, but instead of 4.7 g of the polymer dispersion, 1.5 g of a redispersible polymer powder based on a vinyl acetate-ethylene copolymer, and 3 g of cementitious material was mixed with a metal spatula into the dirt until it seemed homogenous. Then 15 g of water was added to the homogenous mixture and mixed in. The cup was then placed in an oven at 50° C. to accelerate drying. After 12 hours the cup was removed from the oven and was subjectively evaluated for binding of the dust by shaking the cup and observe the mass of particles that is emitted.

EXAMPLE 5

Unlike comparison example 1, 1000 g of MI dirt was introduced into a one liter beaker. To the beaker was added 10 g of a redispersible polymer powder based on a vinyl acetate-ethylene copolymer, and 2.5 g of an ethoxylated fatty alcohol was mixed with a metal spatula into the dirt until it seemed homogenous. Then 15 g of water was added to the homogenous mixture. The beaker was then placed in an oven at 50° C. to accelerate drying.

After 12 hours the beaker was removed from the oven and was subjectively evaluated for binding of the dust by shaking the cup and observe the mass of particles that is emitted.

The bound layer of dirt at the top of each beaker was then removed, physically crushed to a similar particle size as the original MI dirt, was mixed with 5% by weight of the homogeneous mixture from its respective beaker (to simulate mixing that would occur in an actual application), and was added back to the beaker. 15 g of water was then added to the top of the beaker, and the was placed back in the oven at 50° C. to accelerate drying. After 12 hours, the beaker was removed from the oven and was subjectively evaluate for binding of the dust by shaking the beaker and observing the mass of particles that was emitted.

EXAMPLE 6

According to example 5, but in addition to the redispersible polymer powder and to the ethoxylated fatty alcohol 20 g of cementitious material was mixed with a metal spatula into the dirt until it seemed homogenous. Then 15 g of water was added to the top of the beaker. The cup was then placed in an oven at 50° C. to accelerate drying. After 12 hours the cup was removed from the oven and was subjectively evaluated for binding of the dust by shaking the cup and observe the mass of particles that is emitted.

The bound layer of dirt at the top of each beaker was then removed, physically crushed to a similar particle size as the original MI dirt, was mixed with 5% by weight of the homogeneous mixture from its respective beaker (to simulate mixing that would occur in an actual application), and was added back to the beaker. 15 g of water was then added to the top of the beaker, and the was placed back in the oven at 50° C. to accelerate drying. After 12 hours, the beaker was removed from the oven and was subjectively evaluate for binding of the dust by shaking the beaker and observing the mass of particles that was emitted.

Test Results:

The Results Were Rated as Follows:
3=Very good dust binding, better than state of the art
2=Good dust binding, similar to the state of the art
1=Low dust binding
0=No dust binding

TABLE 1

| Cycle/Sample | Comp. Ex. 1 | Comp. Ex. 2 | Example 3 | Example 4 | Example 5 | Comp. Ex. 6 |
|---|---|---|---|---|---|---|
| First | 2 | 1 | 3 | 2 | 2.5 | 3 |
| Second | — | — | — | — | 2.5 | 3 |

What is claimed is:

1. A process for the consolidation of a soil-containing surface, comprising tilling or scarifying said surface and admixing the soil with at least one water-redispersible polymer powder, an aqueous dispersion thereof, or reemulsifyable-modified redispersible polymer powder or aqueous dispersion thereof.

2. The process of claim 1, wherein the step of admixing comprises spraying onto the surface prior to, during, or following tilling or scarifying.

3. The process of claim 1, wherein the polymer comprises polymerised moieties of one or more monomers selected from the group consisting of vinyl esters, (meth)acrylates, vinyl aromatics, olefins, 1,3-dienes, and vinyl halides and optionally, further monomers copolymerizable therewith.

4. The process of claim 1, wherein the polymer comprises a homopolymer or copolymer of vinyl ester monomer(s), polyvinyl acetate, copolymer(s) of vinyl acetate and ethylene, copolymer(s) comprising vinyl acetate, ethylene and a vinyl ester of α-branched monocarboxylic acid(s) having 9 to 11 C atoms, said polymer optionally containing one or more auxiliary monomers.

5. The process of claim 1, wherein the surface is tilled to a depth of 1 to 500 mm to provide loose material, and the loose material is admixed with the polymer powder or polymer dispersion.

6. The process of claim 1, wherein 0.01 to 5% by weight polymer solids of polymer powder or polymer dispersion, based on the weight of the soil to be stabilized, is admixed.

7. The process of claim 1, wherein the water-redispersible polymer powders are combined with dispersants.

8. The process of claim 1, wherein the polymer is combined with cement and/or gypsum.

9. The process of claim 1, wherein the tilled or scarified surface is levelled and compacted, or graded, following admixture with the redispersible polymer.

10. The process of claim 1, wherein the consolidation is re-activated by exposure to moisture.

11. The process of claim 1, wherein the surface is one or more selected from the group consisting of unpaved dirt roads, forestry roads, agricultural access roads, road shoulders, road bed sub-bases, construction sites, land developments, slopes, dumps, seasonal roads, private roads and driveways, parking lots, airstrips, athletic fields, landing pads, public parks, and athletic fields.

12. A process for reducing dusting of a soil-containing dusting surface, comprising spraying onto said surface an aqueous dispersion of a redispersible polymer powder or a reemulsifyable modified aqueous redispersible polymer dispersion, admixing said aqueous dispersion with the soil to form a moist soil and redispersible polymer powder mixture, and compacting the mixture.

13. The process of claim 12, wherein said redispersible polymer powder is a polyvinyl acetate homopolymer or copolymer.

14. The process of claim 12, wherein at least one redispersible polymer powder is polyvinyl acetate or a copolymer of vinyl acetate and ethylene.

15. A process for the stabilization of a dusting surface, consisting essentially of tilling or scarifying said surface and admixing with water-redispersible polymer powder(s), which are optionally reemulsifiable modified, or reemulsifiable modified aqueous redispersible polymer dispersion(s), and providing sufficient water to cause the redispersible polymer to adhere to soil particles as a binder.

16. The process of claim 1, wherein said consolidation is achieved by admixing with a soil composition a consolidating composition consisting of a redispersible polymer powder, in the form of powder or an aqueous dispersion thereof, optionally a dispersant, and optionally cement.

17. The process of claim 1, wherein said reemulsifyable-modified aqueous polymer dispersion is a polymer dispersion containing an ethoxylated fatty alcohol emulsifier.

18. The process of claim 1, wherein consolidation is accomplished by the addition of a vinyl ester homopolymer or copolymer polymerized by emulsion polymerization in the presence of a polyvinylalcohol, polyvinylpyrrolidone, or polyvinylacetal protective colloid or mixture thereof.

19. A stabilized dusting surface, prepared by the process of claim 1.

20. A stabilized dusting surface, consisting essentially of a surface layer prepared by the process of claim 1.

21. A process for stabilization of a dusting surface, comprising tilling or scarifying said surface, and stabilizing said surface by applying a stabilizing composition consisting essentially of a redispersible polymer powder or aqueous dispersion thereof.

22. A process for stabilizing soil, comprising tilling or scarifying soil to a depth of 50 mm or more, incorporating into the soil a soil stabilizing component comprising from 0.01% to 5% by weight of at least one redispersible polymer powder, supplying sufficient water to moisten the soil, and compacting the soil to provide a stabilized soil upon removal of moisture.

23. The process of claim 22, wherein from 0.2 to 2 weight percent of redispersible polymer powder is employed.

24. The process of claim 22 wherein said redispersible polymer powder is supplied in dry form.

25. The process of claim 22, wherein the redispersible polymer powder is added in the form of an aqueous dispersion, the water in the aqueous dispersion supplying at least a portion of the water required to moisten the soil.

26. The process of claim 24, wherein the redispersible polymer powder is supplied in dry form together with a hydraulically settable cement.

27. The process of claim 22, wherein at least one redispersible polymer powder is a copolymer prepared by aqueous polymerization of ethylene and vinyl acetate followed by spray drying in the presence of a protective colloid spraying assistant.

28. The process of claim 22, wherein the soil stabilizing component consists essentially of one or more redispersible polymer powders or an aqueous dispersion thereof, and optionally a hydraulically settable cement.

* * * * *